US012109589B2

(12) United States Patent
Marx et al.

(10) Patent No.: US 12,109,589 B2
(45) Date of Patent: Oct. 8, 2024

(54) METHOD AND DEVICE FOR CONTROLLING AN ULTRASOUND TOOL UNIT FOR MACHINING ON A MACHINE TOOL

(71) Applicant: DMG MORI Ultrasonic Lasertec GmbH, Stipshausen (DE)

(72) Inventors: Heiko Marx, Morbach (DE); Phillip Goebel, Kirschweiler (DE); Fabian Franzmann, Veitsrodt (DE)

(73) Assignee: DMG MORI Ultrasonic Lasertec GmbH, Stipshausen (DE)

( * ) Notice: Subject to any disclaimer, the term of this patent is extended or adjusted under 35 U.S.C. 154(b) by 308 days.

(21) Appl. No.: 17/616,260

(22) PCT Filed: Jun. 22, 2020

(86) PCT No.: PCT/EP2020/067320
§ 371 (c)(1),
(2) Date: Dec. 3, 2021

(87) PCT Pub. No.: WO2020/260189
PCT Pub. Date: Dec. 30, 2020

(65) Prior Publication Data
US 2022/0250116 A1 Aug. 11, 2022

(30) Foreign Application Priority Data
Jun. 25, 2019 (DE) .................... 10 2019 209 191.1

(51) Int. Cl.
  *B06B 1/02* (2006.01)
  *B23B 37/00* (2006.01)
  *B23Q 17/09* (2006.01)
(52) U.S. Cl.
  CPC ............ *B06B 1/0253* (2013.01); *B23B 37/00* (2013.01); *B23Q 17/0971* (2013.01);
  (Continued)

(58) Field of Classification Search
None
See application file for complete search history.

(56) References Cited

U.S. PATENT DOCUMENTS

2015/0352713 A1   12/2015   Takazakura et al.
2016/0114494 A1    4/2016   Carrasco
2018/0200854 A1    7/2018   Ketelaer

FOREIGN PATENT DOCUMENTS

CN   103635275 A   3/2014
CN   106694932 A   5/2017
(Continued)

OTHER PUBLICATIONS

International Search Report dated Sep. 23, 2020 for PCT App. Ser. No. PCT/EP2020/067320.
(Continued)

*Primary Examiner* — Ryan A Jarrett
(74) *Attorney, Agent, or Firm* — Henricks Slavin LLP

(57) ABSTRACT

The present invention relates to a method and a device for controlling an ultrasound tool unit for machining a workpiece on a machine tool. For this, a plurality of parameter sets are stored on a storage device of a control device of the machine tool. When controlling an ultrasound transducer of the ultrasound tool unit received on a work spindle of the machine tool on the basis of a sensor signal input into a controller by means of a generator operated by the controller, on the basis of a first parameter set, which is associated with the ultrasound tool unit and sets the operation of the controller, an operating setting of the controller is switched by changing the first parameter set setting the operation of the controller on the basis of a second parameter set, which is associated with the ultrasound tool unit, of the plurality of parameter sets stored on the storage device.

13 Claims, 9 Drawing Sheets

(52) U.S. Cl.
CPC ....... *B06B 2201/40* (2013.01); *B06B 2201/73* (2013.01); *B23Q 2717/006* (2013.01)

(56) References Cited

FOREIGN PATENT DOCUMENTS

| | | |
|---|---|---|
| CN | 107695793 A | 2/2018 |
| CN | 109291273 A | 2/2019 |
| DE | 10 2007 013055 A1 | 9/2008 |
| DE | 10 2011 077568 A1 | 12/2012 |
| DE | 10 2012 219254 A1 | 4/2014 |
| DE | 10 2015 212809 A1 | 1/2017 |
| DE | 10 2016 214699 A1 | 2/2018 |
| EP | 2803455 A1 | 11/2014 |
| JP | 2014-523348 A | 1/2014 |
| JP | 2018-039107 A | 3/2018 |
| SU | 975338 A1 | 11/1982 |
| TW | 201410363 A | 3/2014 |
| TW | 201636752 A | 10/2016 |
| TW | 201703928 A | 2/2017 |
| WO | WO 2018103323 A1 | 6/2018 |

OTHER PUBLICATIONS

English language translation of Office Action dated Jun. 29, 2023 for Russian App. Ser. No. 2022101429.
Office Action dated Nov. 6, 2023 for EPO App. Ser. No. 20734178.5, with English language translation.
Office Action dated Jul. 26, 2023 for Taiwan App. Ser. No. 109120696, with English language translation.
Office Action dated Jun. 6, 2023 for Japanese App. Ser. No. 2021-577368 with English language translation.
Office Action dated Nov. 14, 2023 for Japanese App. Ser. No. 2021-577368 with English language translation.
Office Action dated Jun. 9, 2023 for Canadian App. Ser. No. 3,144,119.
Examination Report dated Jun. 9, 2020 for German App. Ser. No. 10 2019 209 191.1 with English machine translation.
Office Action dated Dec. 1, 2023 for Chinese App. Ser. No. 202080047408.8, with English translation.
Office Action dated Dec. 19, 2023 for Indian App. Ser. No. 202137055893.
Office Action dated Apr. 27, 2024 for Chinese App. Ser. No. 202080047408.8, with English translation.

METHOD AND DEVICE FOR CONTROLLING AN ULTRASOUND TOOL UNIT FOR MACHINING ON A MACHINE TOOL

The present invention relates to a method and a device for controlling an ultrasound tool unit for machining a workpiece on a machine tool.

BACKGROUND OF THE INVENTION

The prior art discloses machine tools in which, when a workpiece is machined by a tool, the rotary motion of the tool can be superimposed by an ultrasonic oscillation of the tool.

In this context, EP 1 763 416 B1 describes a tool including a tool holder which at a first end has a tool holder receptacle for adaptation to a rotary spindle nose and at a second end opposite the first end has a tool receptacle, and including a tool head which can be inserted into the tool receptacle, wherein the tool holder comprises a oscillation motor.

In such a machine tool, an ultrasonic transducer in the tool holder, which generates the ultrasonic oscillation of the tool, an oscillating body and the tool inserted in the tool holder constitute a oscillatory system which is caused to oscillate mechanically by an electrical signal, wherein the greatest possible mechanical oscillation amplitude is obtained when the oscillatory system is excited with its resonance frequency.

In this context, the problem arises that the resonance frequency may change in the course of a processing operation. Essentially, there are three reasons for this. On the one hand, the oscillatory system or parts thereof can heat up during processing, thus changing the properties of the material. This leads to a temperature drift of the resonance frequency. On the other hand, the oscillation is damped by the processing forces when the tool contacts the workpiece to be machined, wherein, in the case of a damped oscillation, the resonance frequency of the system is lower than the free resonance frequency of the system.

Furthermore, a new, coupled oscillation system is formed by coupling the oscillation system to the workpiece, the resonance frequency of said oscillation system usually being higher than the free resonance frequency. In practice, these three effects occur in combination and which effect dominates depends on the specific processing situation.

It should also be noted that, in addition to the shift of the resonance frequency, a change in power is also significant since, due to the interaction between the tool and the workpiece, a higher output voltage may be necessary to obtain the same power.

If the free resonance frequency is used for excitation, but the actual resonance frequency of the system differs therefrom during processing, the oscillation of the tool will have a lower amplitude, thus rendering the processing less efficient.

For this reason, it is important to detect a change in the resonance frequency of the oscillatory system to be able to correspondingly adjust the oscillation parameters in such a way that the largest possible oscillation amplitude is obtained again.

It is known from ultrasonic welding applications to determine, for this purpose, both the free resonance frequency and a change in the resonance frequency of the system from initial values of the generator, which supplies the electrical signal for the mechanical oscillation to the piezo drive in the tool holder. From the oscillatory system connected via an inductive transmission path, the generator senses an electrical impedance which depends on the frequency and has a minimum at the mechanical resonance frequency. Accordingly, in case of a shift of the resonance frequency, the generator readjusts its frequency until it reaches the impedance minimum again. In addition to the frequency of the impedance minimum, the impedance value as such also changes due to the processing operation, i.e., a higher output voltage is necessary to drive the same power.

However, this method is not suitable for machining because, unlike with ultrasonic welding, the impedance curves of the employed sonotrodes are much more complex with inserted tools. On the one hand, there are significantly more impedance minima due to the many different oscillation modes of tools with complex forms. On the other hand, the influencing variables causing a shift of the resonance frequency have a more extreme effect, i.e., the frequency shift may be so large that further impedance minima are skipped. Throughout the entire welding process, a sonotrode exerts almost the same pressure on the workpiece. This results in a single frequency shift which is the same in recurring processes and for which the impedance minimum can always be clearly identified. However, the frequency shift constantly changes during machining on account of varying engaging conditions of the tool into the material and, as described above, the mapping is often no longer possible by means of an impedance measurement alone.

This is because a great many tools with different forms are used, e.g. drills and milling tools having different dimensions and cutting tools having different cutting geometries, which leads to a higher variance in the shape of the impedance curve compared to ultrasonic welding. Furthermore, the force acting on the oscillatory system in a machining operation is generally significantly higher, and therefore the change in the impedance curve is much more pronounced.

In addition, due to the recurring processing steps during welding, the dominating frequency shift effect can be predicted well, which limits the possible reactions of the system. Meanwhile, all effects have to be taken into account for a machining operation, and this is why the possibilities for prediction and/or for limiting the control parameters are insufficient. Moreover, it is not possible to distinguish flexural oscillations or the like from axial oscillation modes only on the basis of the impedance measurement. There are also purely electrical resonances which do not produce any oscillations at all. These parasitic effects cannot be detected by the known methods.

A further problem arising when monitoring the oscillation on the basis of the generator power is that it is not known which portion of the power does go into the oscillation generation and which portion goes into other processes such as the heating of the components involved. Therefore, it is possible that changes in the oscillation are not detected because, although the portion of the power provided by the generator which is used for the oscillation generation is subject to change, the overall power provided by the generator does not change.

For this reason, it is important to detect a change in the resonance frequency of the system capable of oscillation in order to be able to adapt the oscillation parameters accordingly, so that the greatest possible oscillation amplitude is again achieved.

In light of the above considerations, a generic method for controlling an oscillatory system was described in DE 10 2015 212 809 A1, in particular using control of the generator by determining the resonance frequency and control on the basis of the determined resonance frequency.

Based on the above prior art and in view of the above considerations, it is an object of the present invention to further develop the generic method in order to provide improved control of the oscillatory system better adaptable to different processing conditions.

In particular, it is an object of the present invention to provide a method which makes it possible to achieve higher machining accuracy in the ultrasonic machining of a workpiece under various or changing machining conditions.

SUMMARY OF THE INVENTION

For achieving the above objects, the subject matter of the independent claims is proposed. The dependent claims relate to advantageous exemplary embodiments of the method according to the invention or of the devices according to the invention.

According to exemplary embodiments, a device for controlling an ultrasound tool unit for machining a workpiece on a machine tool is proposed, comprising a control device for controlling an ultrasound transducer of the ultrasound tool unit received on a work spindle of the machine tool for machining a workpiece on the basis of a sensor signal input to a controller by means of a generator operated by the controller, on the basis of a first parameter set which is associated with the ultrasound tool unit and sets the operation of the controller.

The control device preferably comprises a storage device for storing a plurality of parameter sets. The control device is preferably configured to switch an operating setting of the controller by changing the first parameter set setting the operation of the controller on the basis of a second parameter set, associated with the ultrasound tool unit, of the plurality of parameter sets stored on the storage device.

According to a preferred exemplary embodiment, the control device is configured to switch the operating setting of the controller when machining the workpiece.

According to a preferred exemplary embodiment, the control device is configured to switch the operating setting of the controller when the type of processing of the workpiece is changed.

According to a preferred embodiment, the first parameter set is associated with a first type of processing of a plurality of types of processing and the second parameter set is preferably associated with a second type of processing of the plurality of types of processing.

Preferably, the plurality of types of processing include milling and drilling.

According to a preferred exemplary embodiment, when the ultrasound tool unit on the machine tool is replaced with another ultrasound tool unit, the control device is configured to switch the operating setting of the controller by changing a parameter set associated with the ultrasound tool unit on the basis of a parameter set associated with the other ultrasound tool unit of the plurality of parameter sets stored in the storage device.

According to a preferred exemplary embodiment, when a tool on the ultrasound tool unit on the machine tool is replaced with another tool, the control device is configured to switch the operating setting of the controller by changing a parameter set associated with the tool on the basis of a parameter set associated with the other tool of the plurality of parameter sets stored in the storage device.

According to a further exemplary embodiment, a machine tool with a work spindle for receiving an ultrasound tool unit and a device for controlling the ultrasound tool unit for machining a workpiece on the machine tool according to one of the above aspects is proposed.

According to exemplary embodiments, a method for controlling an ultrasound tool unit for machining a workpiece on a machine tool is also proposed, comprising controlling an ultrasound transducer of the ultrasound tool unit received on a work spindle of the machine tool for machining a workpiece on the basis of a sensor signal input into a controller by means of a generator operated by the controller, on the basis of a first parameter set which is associated with the ultrasound tool unit and sets the operation of the controller.

The method preferably comprises storing or depositing a plurality of parameter sets on a storage device of a control device of the machine tool.

The method preferably comprises switching an operating setting of the controller by changing the first parameter set setting the operation of the controller on the basis of a second parameter set, associated with the ultrasound tool unit, of the plurality of parameter sets stored on the storage device.

According to a preferred embodiment, the switching of the operating setting of the controller is carried out when the workpiece is being processed.

According to a preferred exemplary embodiment, the switching of the operating setting of the controller is carried out when the type of processing of the workpiece is switched.

According to a preferred embodiment, the first parameter set is associated with a first type of processing of a plurality of types of processing and the second parameter set is preferably associated with a second type of processing of the plurality of types of processing.

According to a preferred embodiment, the plurality of types of processing may include milling and drilling.

According to a preferred exemplary embodiment, the method comprises exchanging the ultrasound tool unit on the machine tool with another ultrasound tool unit and switching an operating setting of the controller by changing a parameter set associated with the ultrasound tool unit on the basis of a parameter set associated with the other ultrasound tool unit of the plurality of parameter sets stored on the storage device.

According to a preferred exemplary embodiment, the method comprises exchanging a tool on the ultrasound tool unit on the machine tool with another tool and switching an operating setting of the controller by changing a parameter set associated with the tool on the basis of a parameter set associated with the other tool of the plurality of parameter sets stored on the storage device.

Further aspects and their advantages as well as advantages and more specific implementation options of the aspects and features described above are described with the following descriptions and explanations of the attached figures, which are not to be interpreted in any limiting sense.

DETAILED DESCRIPTION OF THE FIGURES AND PREFERRED EMBODIMENTS OF THE PRESENT INVENTION

Hereinafter, examples or exemplary embodiments of the present invention are described in detail with reference to the attached figures. Same or similar elements in the figures may be designated with the same reference symbols, yet sometimes also with different reference symbols.

It should be emphasized that the present invention is in no way limited or restricted to the exemplary embodiments and their implementation features described below, but instead further includes modifications of the exemplary embodiments, in particular those that are included within the scope of the independent claims by modifications of the features of the described examples or by combinations of one or more of the features of the examples described.

Figure 1:
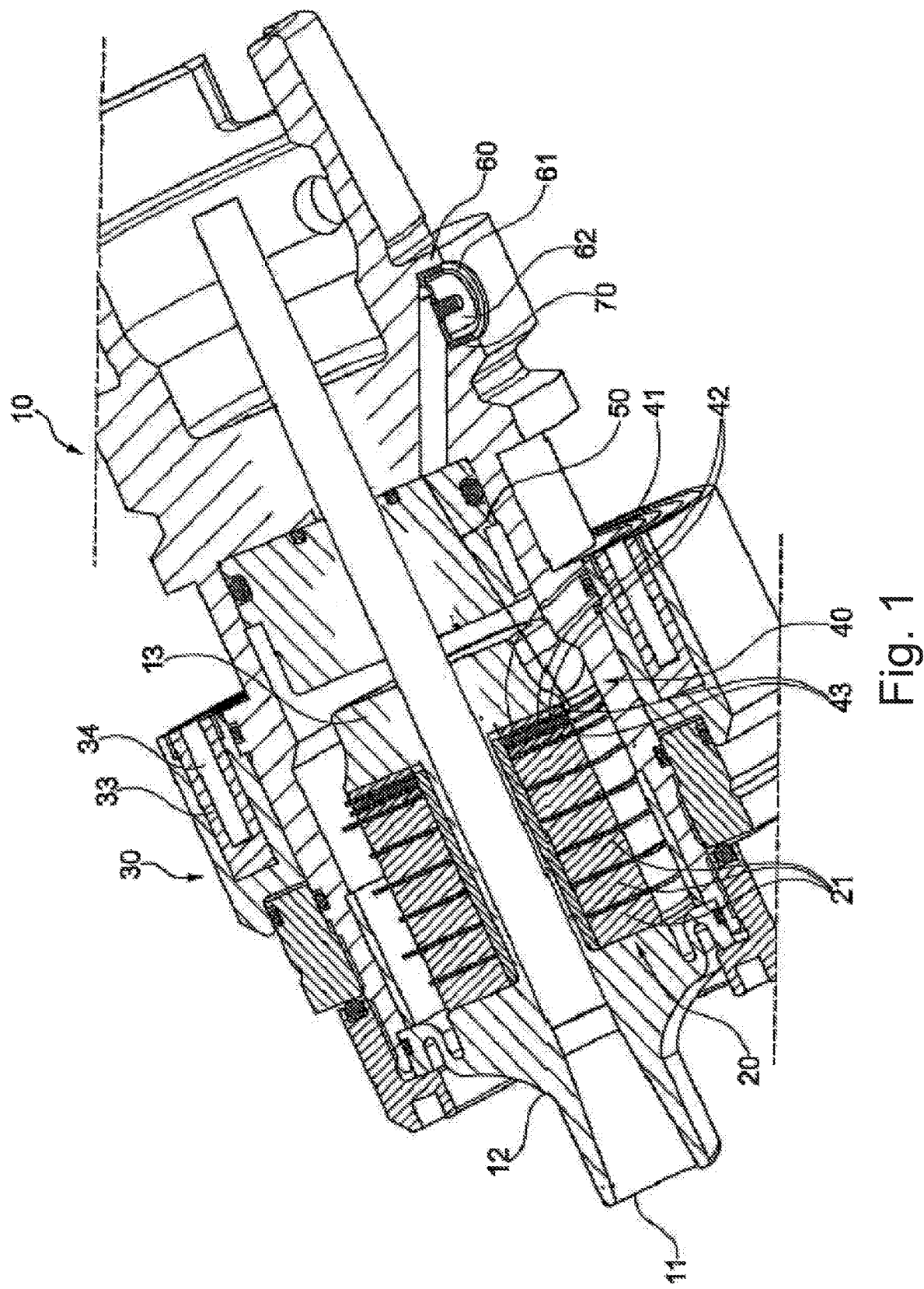
FIG. 1 shows a sectional view of a tool holder which can be used in the method according to the invention.

FIG. 1 shows an exemplary design of a tool holder 10 which can be used in the method according to the invention. By way of example, a tool receptacle portion 11 for receiving a tool 90 (not shown) is disposed at one end of the tool holder 10.

A plurality, e.g. six, perforated disk-shaped first piezo elements 21 are arranged in the tool holder 10 in stacked fashion, the piezo elements 21 being connected, by way of example, to the tool receptacle portion 11 via a transmission portion 12 and constituting an ultrasonic transducer 20 for converting an electric voltage into a mechanical oscillation.

The mechanical oscillation of the first piezo elements 21 is transmitted to the tool 90 via the transmission portion 12, for example. The first piezo elements 21 may be configured, e.g., as piezo ceramic disks with electrodes mounted between them. The energy is supplied to the ultrasonic transducer 20 via a transformer (first transformer) which, on the machine side, consists of a first pot core 31 and a primary winding 32 (not shown) and, on the tool side, of a second pot core 33 and a secondary coil 34, which, by way of example, are arranged as ring elements on the outer side of the tool holder 10.

By way of example, on a side of the stack of first piezo elements 21 that faces away from the tool receptacle portion 11, a perforated disk-shaped piezoelectric sensor element 40 is arranged, which is mechanically coupled to the first piezo elements 21 and is electrically insulated from the first piezo elements 21 by an insulation element 43 which may consist of a ceramic perforated disk. The piezoelectric sensor element 40 is electrically insulated, by way of example, from a fastening element 13, e.g. a fastening nut, by a further insulation element 43. The fastening element 13 serves to attach the piezoelectric sensor element 40 to the ultrasonic transducer 20 and to bias the first piezo elements 21 due to the dynamic load, by way of example.

The first piezo elements 21 and the piezoelectric sensor element 40 have the same orientation, thereby, on the one hand, rendering possible the generation and the detection of the oscillation in the same direction and, on the other hand, achieving a space-saving arrangement of the elements in the tool holder 10.

The piezoelectric sensor element 40 converts the mechanical oscillations of the oscillatory system comprising the tool 90, the transmission portion 12, the ultrasonic transducer 20 and the piezoelectric sensor element 40 into a sensor signal S2, which is transmitted as an electric voltage via a wire connection 50 from the piezoelectric sensor element 40 through the tool holder 10 to a transmitter element 60 on the outer side of the tool holder 10. The sensor signal S2 is transmitted in contactless fashion from the transmitter element 60 to a receiver element 80 (not shown) on the machine side. The transmitter element 60 is part of a further transformer (second transformer) and consists of a first ferrite core 61 and a primary winding 62; the receiver element 80 is also part of the second transformer and consists of a second ferrite core 81 and a secondary winding 82. Thus, the sensor signal S2 can be transmitted inductively from the tool holder 10 to a sensor signal evaluation device 110 (not shown) on the machine side. Alternatively, an optical transmission is also possible, wherein the transmitter element 60 is configured as an LED and the receiver element 80 is configured as a photodiode. The transmitter element 60 may be dimensioned and positioned in such a way that is fits into a bore 70 for a data chip for tool data according to the DIN 69893 standard. The tool holder 10 may be rotatable with respect to a stationary part of the machine tool (not shown).

Figure 2:
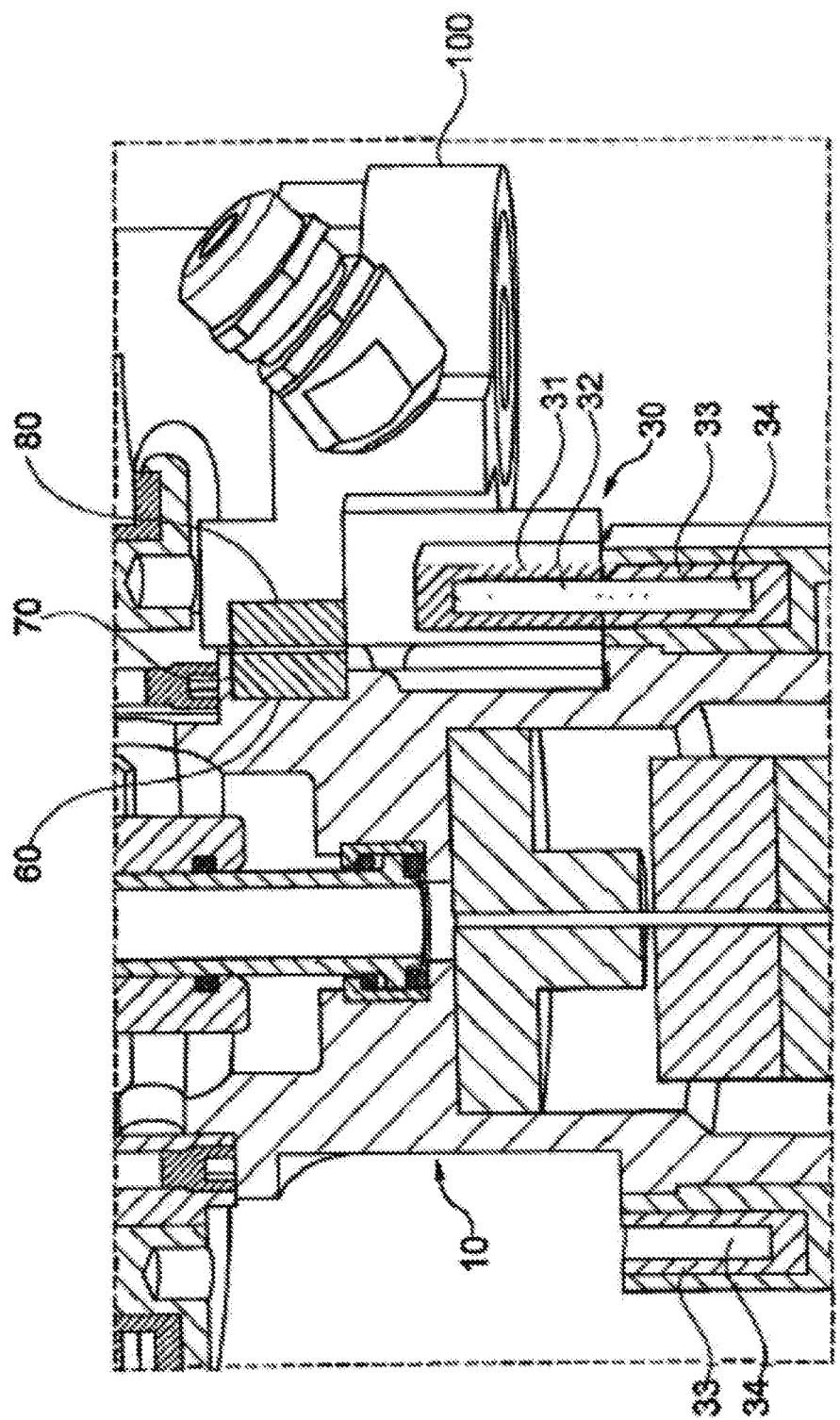
FIG. 2 shows part of a machine tool, by means of which the method according to the invention can be carried out.

FIG. 2 shows, by way of example, a sectional view of an arrangement of the energy transmission device 30 for transmitting the energy for the ultrasonic transducer 20 into the tool holder 10 in the form of a working signal S1 and the arrangement of the transmitter element 60 and the receiver element 80 for transmitting the sensor signal S2 from the tool holder 10.

The energy transmission device 30 is configured as a transformer (first transformer) having a first pot core 31, a primary winding 32, a second pot core 33 and a secondary winding 34, wherein, by way of example, the openings of the pot cores 31, 33 face each other and the windings 32, 34 are arranged in the respective pot cores 31, 33. Here, the second pot core 33 is arranged annularly along the tool holder periphery; by way of example, the first pot core 31 is positioned in a housing 100 on the machine side so as to be spaced apart from the second pot core 33 in axial direction and is arranged either as a ring segment or as a full ring around the tool holder 10. The working signal S1 is thus transmitted inductively in axial direction (from top to bottom in FIG. 2) from the primary winding 32 to the secondary winding 34.

By way of example, the receiver element 80 is also located within the housing 100. The transmitter element 60 is arranged opposite to and at a distance from the receiver element 80 in a bore 70 on the tool holder 10. The sensor signal S2 is thus transmitted in contactless fashion in a radial direction (from left to right in FIG. 2) from the transmitter element 60 to the receiver element 80. It is also possible to arrange a plurality of transmitter elements 60 circumferentially on the tool holder 10 to reduce signal losses when the sensor signal S2 is transmitted during a rotation of the tool holder 10. Likewise, a plurality of receiver elements 80 may be arranged opposite the transmitter element 60 or the transmitter elements 60.

During the rotation of the tool holder 10, the second pot core 33 and the secondary winding 34 of the energy transmission device 30 as well as the transmitter element 60 corotate with the tool holder 10 while the housing 100 with the first pot core 31 and the primary winding 32 of the energy transmission device 30 as well as with the receiver element 80 is mounted, e.g., on the tool spindle (not shown) and does not rotate.

Hereinafter, the behavior of the oscillatory system during a processing operation is described by means of FIG. 3. The oscillatory system which in one embodiment of the invention includes the ultrasonic transducer 20 as a piezo drive, the transmission portion 12, the tool 90 inserted into the tool receptacle portion 11, the piezoelectric sensor element 40 for generating a sensor signal S2 and the fastening element 13 for the piezoelectric sensor element 40, is excited to oscillate mechanically by a working signal S1, which is produced by a generator 120 and is transmitted via the energy transmission device 30 to the ultrasonic transducer 20. Here, the working frequency f1 of the working signal S1 determines the frequency of the mechanical oscillation and the power P1 supplied by the generator 120 determines the oscillation amplitude. For a given power P1, the oscillation amplitude becomes maximum at the resonance frequency f2 of the oscillatory system, wherein the resonance frequency f21 of the free oscillation of the system usually differs from the resonance frequency f22 of the system during processing.

Figure 3:
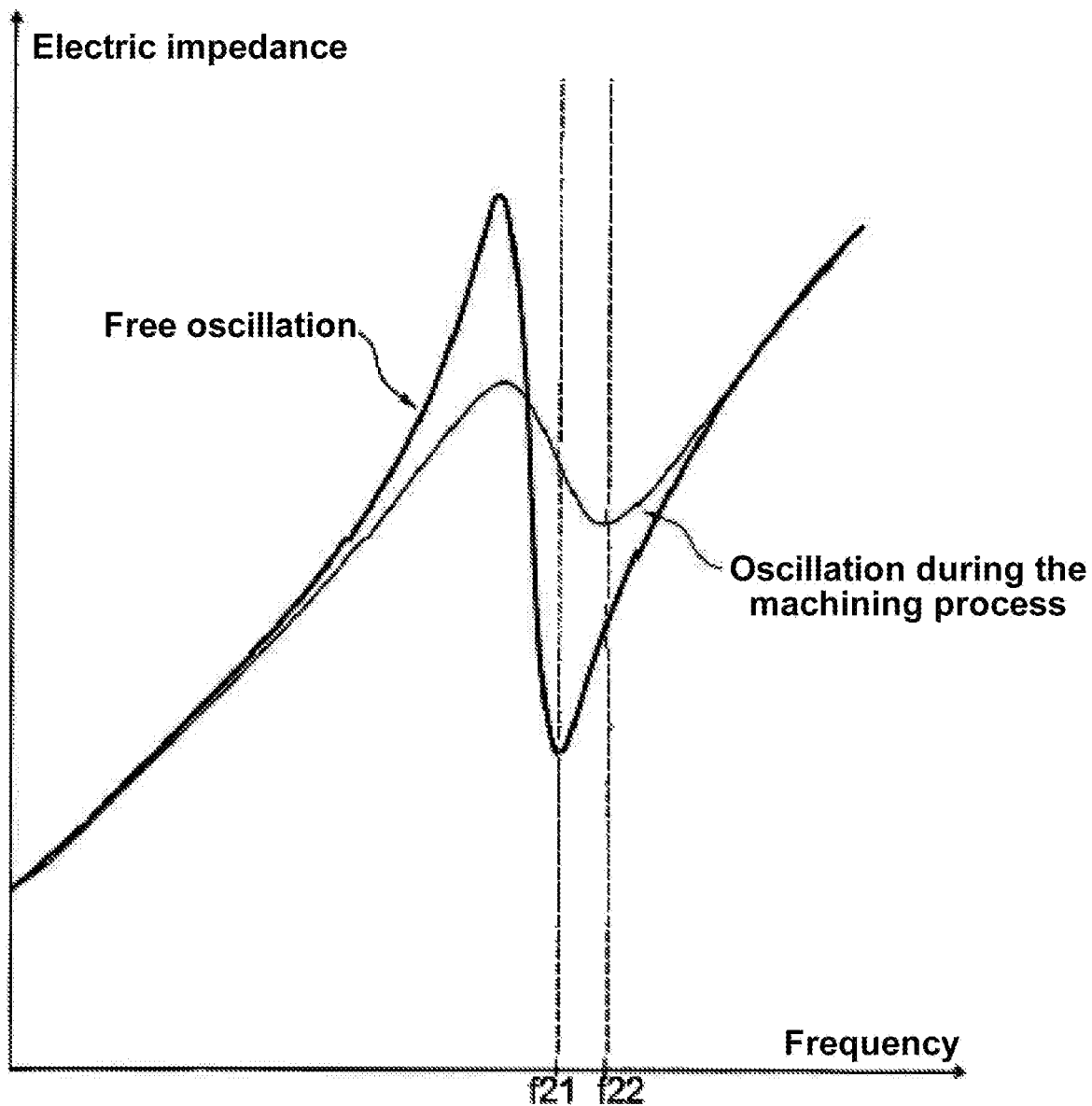
FIG. 3 shows an electrical impedance curve.

FIG. 3 shows, by way of example, electrical impedance curves which the generator 120 senses from the oscillatory system connected via the first transformer 31-34 as inductive transmission path. The impedance curve of the free oscillation has an impedance maximum (series resonance) at a lower frequency and an impedance minimum (parallel resonance) at a higher frequency. The position of the impedance minimum corresponds to the resonance frequency f21 of the free oscillation.

During machining, the generator 120 senses a changed impedance curve with less pronounced extrema. In addition, the minimum is shifted with respect to the minimum in the free oscillation. In FIG. 3, the minimum is shifted towards higher frequencies during processing, i.e. in the illustrated example the resonance frequency f22 during processing is higher than the resonance frequency f21 of the free oscillation. However, it is also possible that during processing the resonance frequency f22 becomes less than the resonance frequency f21 of the free oscillation. Which case will occur and how strongly the resonance frequency will change depends on the influence of the damping by the processing forces, the heating of the system during processing and the resonance behavior of involved coupled oscillation systems.

The free resonance frequency f21 can be determined on the basis of initial values of the generator 120 supplying the working signal S1 for the piezo drive or by means of the method according to the invention, which is explained in more detail below with reference to FIG. 4, before the tool 90 advances into the workpiece, and may be used as an estimate for a working frequency f1, by means of which the highest possible oscillation amplitude is achieved. The method according to the invention is applied to detect a change in the resonance frequency f2 during processing, the value of which may then be used to bring the working frequency f1 closer to the actual resonance frequency f2 or to increase the power of the working signal S1 such that the original amplitude is again achieved.

Figure 4:
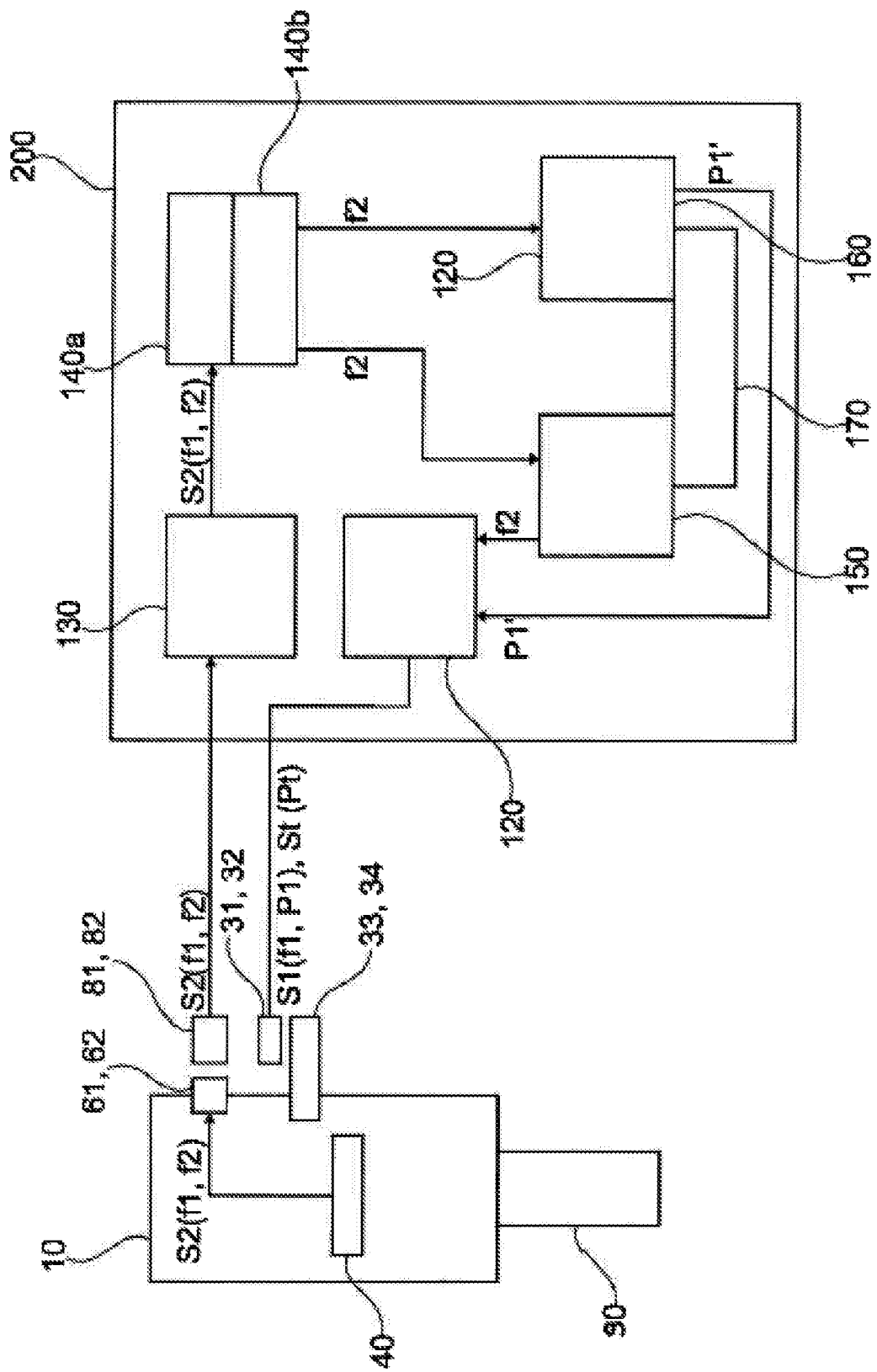
FIG. 4 schematically shows an exemplary embodiment of a device according to the invention.

FIG. 4 schematically shows a device according to the invention, by means of which the method according to the invention can be carried out. The device may be part of a machine tool. This figure shows a tool holder 10 having a piezoelectric sensor element 40, the design of which corresponds to the tool holder 10 shown in FIG. 1. A tool 90 for ultrasonic machining of workpieces is received at the tool holder 10.

A generator 120 outputs a working signal S1 as the drive signal for the piezo drive in the tool holder 10. The working signal S1 has the working frequency f1 and is transmitted with power P1 in contactless fashion to the rotating tool holder 10 via the energy transmission device 30 configured as a transformer consisting of the primary winding 32 with the first pot core 31 and the secondary winding 34 with the second pot core 33. Furthermore, the generator 120 outputs a test signal St of power Pt<P1, which is superimposed onto the working signal S1 and the frequency of which varies in a range around f1.

Figure 5:
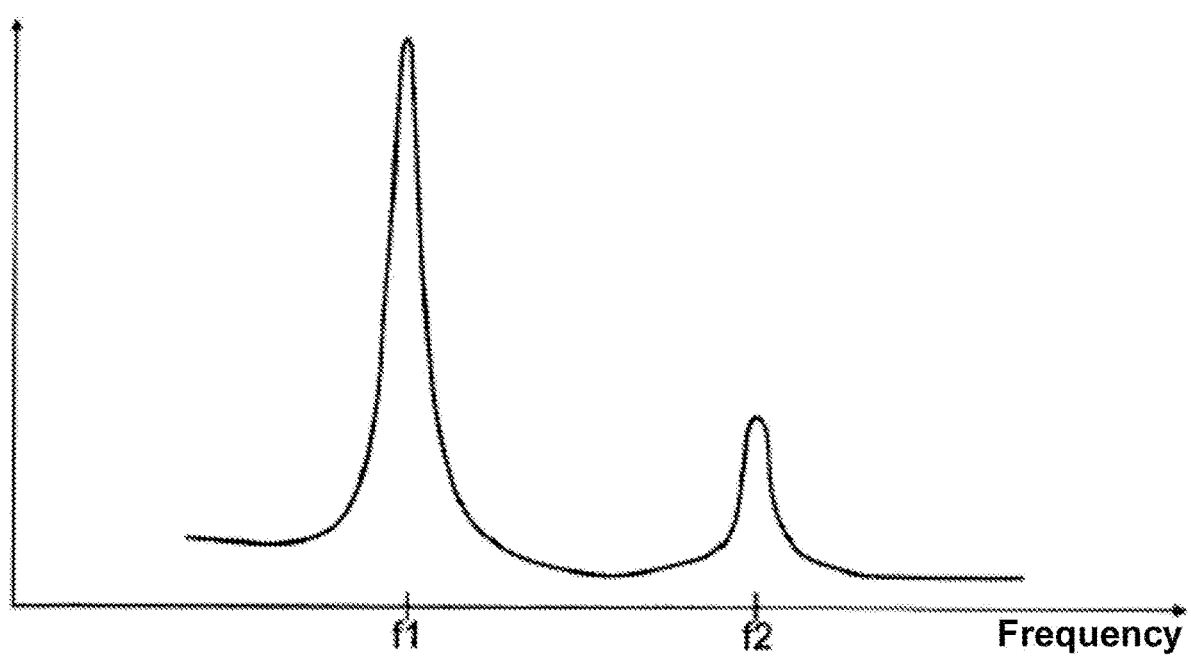
FIG. 5 shows an exemplary frequency spectrum.

As a result of the signals S1 and St, the oscillatory system in the tool holder 10 is excited to oscillate, the frequency spectrum of this oscillation substantially having two frequencies. An exemplary frequency spectrum is shown in FIG. 5. The higher peak in the frequency spectrum results from the forced oscillation of the system excited by the working frequency f1 at a relatively high power P1. The smaller peak results from the forced oscillation of the system excited at a frequency varying about f1. However, this oscillation is at such a low power Pt that it very rapidly fades away due to damping at all frequencies except for the current resonance frequency f2 of the system.

Due to the oscillation of the oscillatory system, the piezoelectric sensor element 40 also oscillates in the same way and thus generates an electric sensor signal S2 containing the information on the frequency spectrum of the oscillation. The sensor signal S2 is read from the rotating tool holder 10 by a read-out device 130 in contactless fashion via a further transformer consisting of the primary winding 62 with the first ferrite core 61 and the secondary winding 82 with the second ferrite core 81 and is transmitted to an analyzer 140*a*.

The analyzer 140*a* determines, by way of example, the frequencies contained in the frequency spectrum of S2 such that, in an device for determining the resonance frequency 140*b* which may be implemented as part of the analyzer 140*a*, the frequency of the highest peak in the spectrum (main frequency) can be associated with the working frequency f1 and the frequency of the smaller peak in the spectrum (side frequency) can be associated with the resonance frequency f2. The read-out device 130, the analyzer 140*a* and the device for determining the resonance frequency 140*b* may also be combined into two devices or be implemented as a single device.

The value of the determined resonance frequency f2 is transmitted to a first control device 150 which controls the generator 120 in such a way that the frequency f1 of the working signal S1 is adjusted to the value of the resonance frequency f2.

Alternatively or additionally, the value of the determined resonance frequency f2 may be transmitted to a second control device 160 which controls the generator 120 in such a way that the power P1, by means of which the working signal S1 is radiated into the tool holder 10, is increased to a power P1' in such a way that the mechanical oscillation amplitude, which would be achieved as maximum amplitude in the case of an excitation with the resonance frequency f2, is reached even in the case of an excitation with f1g2.

In this way, the mechanical oscillation amplitude of the tool tip can be stabilized at a certain value, having a positive effect on the precision during the machining operation with tool 90. When the oscillation amplitude is stabilized at the maximum value possible with a certain power, the efficiency of the workpiece processing is also increased.

A user of the device can control the first control device 150 and/or the second control device 160 via a user interface 170 in such a way that the working signal S1 is only adjusted at the command of the user or when a set condition occurs. The user may also determine that the working signal S1 is automatically adjusted at regular or irregular intervals on the basis of the last determined resonance frequency f2.

The generator 120, the read-out device (or detection device) 130, the analyzer 140a and the first control device 150 may be combined into a device 200 for outputting output signals and receiving input signals, wherein a first output signal of this device 200 corresponds to the working signal S1, a second output signal corresponds to the test signal St, and an input signal corresponds to the sensor signal S2.

Figure 6:
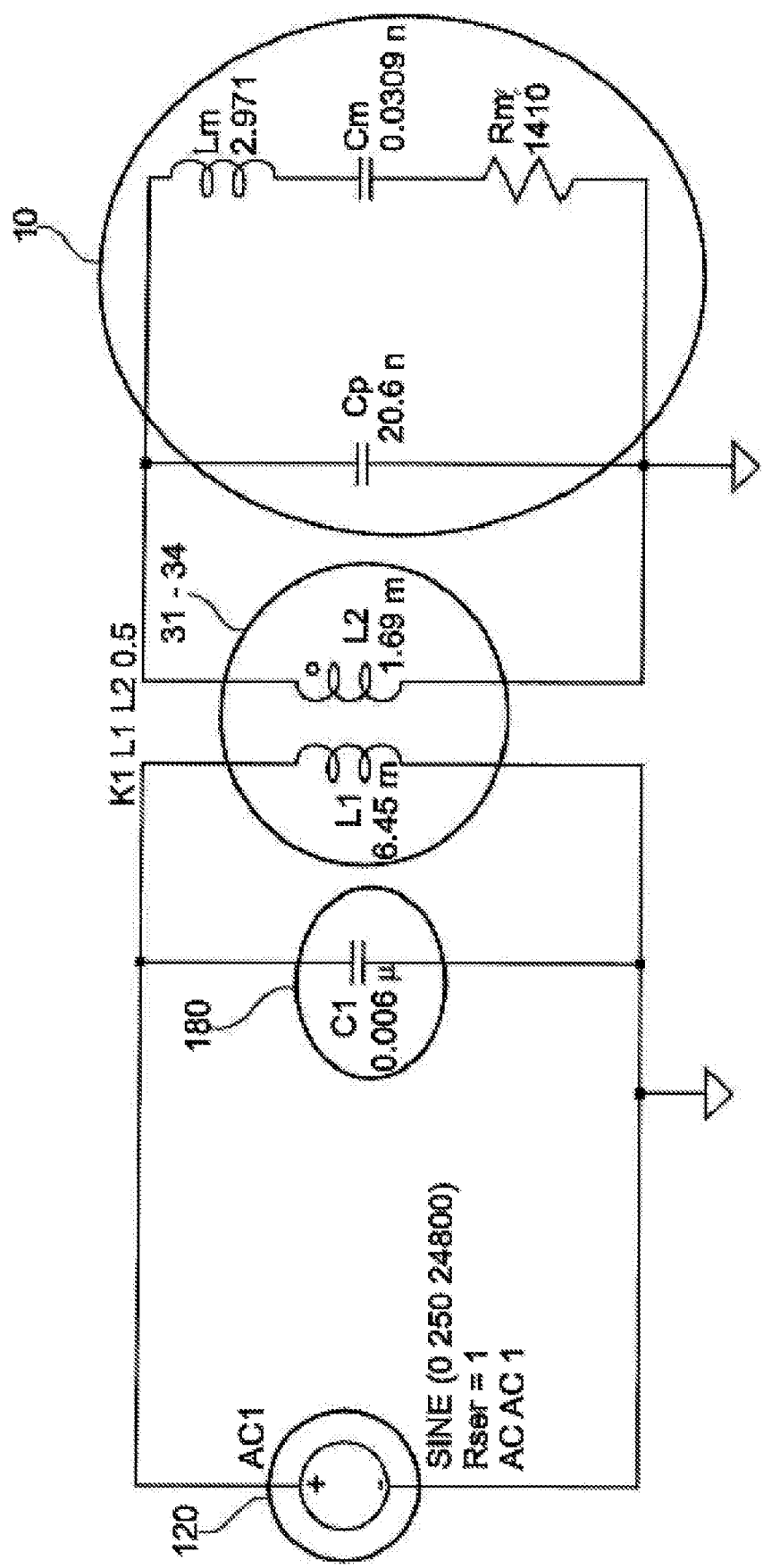
FIG. 6 shows an exemplary embodiment of a device according to the invention

FIG. 6 shows a circuit diagram of the above described components with an exemplary compensation circuit. It shows the replacement circuit diagram of the piezo drive in the tool holder 10, the first transformer 31-34 with the primary winding 32 on the left and the secondary winding 34 on the right, and the ultrasonic generator 120. On the machine side, a capacitance 180 is connected in parallel to the transformer 31-34, the value of the capacitance being changeable via a relay 190 (not shown).

Depending on the phase shift between voltage and current, reactive power reciprocates between the generator 120 and the tool holder 10 and does not perform any mechanical work but only contributes to heating the system. The reactive power can be compensated for by the capacitance 180. However, since the compensated electrical impedance also has a frequency response, the compensation only works with sufficient accuracy at a constant value of the capacitance 180 when the changes in the working frequency f1 are small. In case of a large change and/or a large deviation of the resonance frequency f2 from the working frequency f1, the value of the capacitance 180 is correspondingly switched by a relay 190.

The compensation circuit may be configured as a parallel circuit, a series circuit or a combination circuit from capacitances and/or inductances and may be switched by a relay 190.

Figure 7:
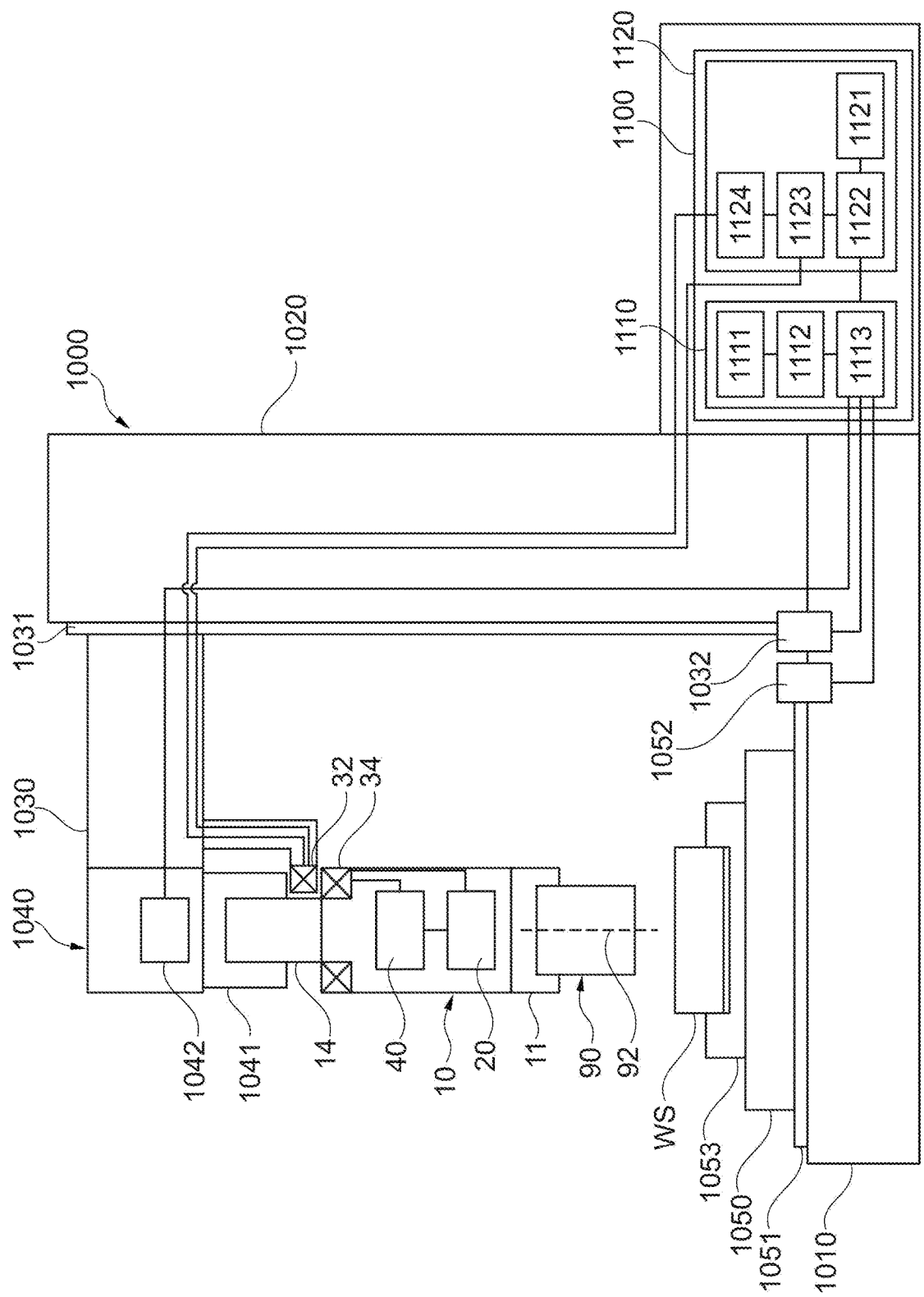
FIG. 7 shows an example of a schematic illustration of a machine tool with a tool holder (tool head) which can be used in the method according to the invention in accordance with exemplary embodiments.

FIG. 7 shows an example of a schematic illustration of a machine tool 1000 according to an exemplary embodiment of the invention, including a tool holder 10 (tool head) which can be used in the method according to the invention according to exemplary embodiments.

The machine tool 1000 may, e.g., be configured as a numerically controllable milling machine, numerically controllable universal milling machine or as a numerically controllable machining center. In order to control a relative movement between the tool and the workpiece, the machine tool may have a plurality of controllable linear axes (usually referred to as the X axis, Y axis and/or Z axis) and/or one or more rotary or rotational axes (generally referred to as, for example, A-axis, B-axis and/or C-axis).

By way of example, the machine tool 1000 in FIG. 7 includes a machine bed 1010, a machine stand 1020 and a spindle head 1030, the machine bed 1010 carrying a workpiece table 1050 and the spindle head 1030 carrying a work spindle 1040, by way of example.

The tool table 1050 is mounted, for example, on horizontal linear guides 1051, which are arranged on the machine bed 1010 in a horizontal direction, so as to be linearly displaceable in the horizontal direction and is controllably movable via a linear drive 1052 of a first linear axis of the machine tool 1000. A workpiece WS is clamped, for example, on the tool table in a workpiece clamping device 1053.

The spindle head 1030 is mounted, by way of example, on vertical linear guides 1031, which are arranged on the machine stand 1020 in a vertical direction, so as to be linearly displaceable in the vertical direction, and is controllably movable via a linear drive 1032 of a second linear axis of the machine tool 1000 in such a way that the work spindle 1040, on which a tool head 10 (tool holder) holding a tool 90 is received, can be moved vertically.

In further exemplary embodiments, one or more further linear axes may be provided, e.g., in order to additionally enable a linear movement of the workpiece relative to the tool in a direction perpendicular to the plane of the drawing in FIG. 7.

Furthermore, one or more rotary or rotational axes may be provided, such as a rotary axis with a rotary axis drive for rotating the tool table 1050 (so-called rotary table). A relative movement of the tool 90 relative to the workpiece WS may be controlled by means of the above-described linear and possibly rotary or rotational axes or their drives.

For this purpose, a control device 1100 of the machine tool 1000 includes a machine control device 1110 comprising, for example, a CNC or NC control device 1112 configured to control the functions or machining processes at the machine tool 1000, for example based on NC data stored in a storage device 1111. In addition, the machine control device 1110 includes, for example, a PLC or SPS device 1113 ("PLC" for programmable logic controller or "SPS" for memory programmable control).

The PLC or SPS device 1113 is particularly preferably configured to transmit control signals to actuators of the machine tool, for example to the linear drives 1052 or 1032 of the linear axes or generally to drives of the machine axes or also to the spindle drive 1042 of the work spindle 1040, on the basis of control commands from the NC control device 1112 or possibly also independently from the NC control device 1112.

In addition, the PLC or SPS device 1113 is configured to receive or read out sensor signals from position measuring sensors (not shown) of the machine tool 1000, which indicate the actual positions of the drives and/or machine axes measured during processing, and, if necessary, forward them to the NC control device 1112. The PLC or SPS device 1113 may also be configured to enable other machine-internal or external devices or apparatus to read out position data indicating the actual positions of the drives and/or machine axes on the PLC or SPS device 1113.

In addition to the above-mentioned spindle drive 1042, the work spindle 1040 also includes a tool holder 1041 (tool holder portion), on which the tool head 10 is received and which can be driven rotationally by means of the spindle drive 1042 (in particular for generating the cutting movement).

The tool head 10 is only shown schematically and includes, by way of example, a tool interface body 14 (e.g. a tool taper, or steep or hollow shank taper, or also a Morse taper or other tool interfaces) by means of which the tool head 10 is received on the tool holder 1041 of the work spindle 1040. For example, the tool head 10 may be configured analogously to FIG. 1.

The tool head 10 includes, by way of example, an inductive receiver unit 32 (e.g., analogous to the secondary coil or winding 34 of FIG. 1) for contactless or inductive reception of a control signal from the transmitter unit 32 (primary coil or winding) attached to the spindle head (or to the spindle).

As an example, the tool head 10 in FIG. 7 further includes an actuator 20 (e.g., ultrasonic transducer or ultrasonic generator, possibly including one or more piezo elements, for example) and a sensor 40 for controlling the actuator 20. The actuator 20 is configured to make the tool head 10 or the tool 90 received in the tool head 10 oscillate (in particular in the direction of the tool axis 92) based on the control signal, preferably, in particular, in the ultrasonic range, i.e. in particular at ultrasonic frequencies or at frequencies above 10 kHz or, in particular, over 15 kHz, e.g. up to 60 kHz.

The tool head 10 also includes the tool receptacle portion 11, on which the milling tool 90 is received or held. The tool 90 has a tool axis 92, about which the tool is driven rotationally via the spindle drive 1042.

In order to drive the actuator 20 or to control or regulate the oscillation of the tool 90, the control device 1100 of the machine tool 1000 includes a further control device 1120 (ultrasound transducer control) which generates the control signal on the basis of the sensor signal from the sensor 40 (oscillation control) and outputs it via the transmitter unit 32 to the tool head 10 for transmission to the receiver device 34 for the actuator 20. In further exemplary embodiments, the control device 1120 may also be integrated into the machine control device 1110 and/or comprise an external data processing device, e.g. a computer, or be formed by an externally connected data processing device, e.g. a computer.

The control device 1120 comprises, by way of example, a generator 1124 (for example analogously to the generator 120 above) for generating the high-frequency control signal output to the actuator 20. The frequency of the control signal is high-frequency (i.e., in particular with a frequency greater than 10 kHz, preferably greater than 15 kHz) and is preferably in the ultrasonic range.

The generator 1124 is connected, for example, to a controller unit 1123, configured to control the operation of the generator 1124 on the basis of the sensor signal from the sensor 40 output to the controller unit. The control may be carried out analogously to the aspects described above, for example.

The control device 1120 furthermore comprises, by way of example, a storage device 1121 for storing parameter data, in particular comprising control parameters used by the control device 1120 as the basis for controlling the actuator 20 (ultrasonic transducer).

The control device 1120 also comprises, by way of example, a data processing device 1122 configured to read out and process the data from the storage device 1121. In particular, the data processing device 1122 is configured to read out parameter data from the storage device 1121 and to determine control parameters input to the controller 1123 as the basis for controlling the operation of the generator 124.

According to exemplary embodiments of the invention, it is contemplated to store a plurality of parameter sets as parameter data in the storage device 1121, the respective parameter sets being associated with different tools, different ultrasound transducers, different tool holders and different types or conditions of processing.

In particular, the data processing device 1122 is preferably configured to read out a suitable parameter set from the storage device 1121 on the basis of a tool, tool holder, ultrasonic transducer currently being used, and in particular on the basis of a current type of processing or on the basis of the current processing conditions and to output corresponding control parameters to the controller 1123.

For this purpose, it is preferably possible to carry out a parameter set change before or during processing in order to adjust the controller 1123 in a processing-dependent manner on the basis of a changed parameter set.

By way of example, a parameter set change may be carried out during processing when a tool is replaced on the machine tool 1000, wherein a changed parameter set corresponding to the tool to be inserted, tool holder and/or its ultrasonic transducer is read out in the storage device 1121 and set at the controller 1123.

By way of example, a parameter set change may also be carried out during processing on the machine tool 1000, wherein a changed parameter set corresponding to changed processing conditions or a changed type of processing is read out on the storage device 1121 and set at the controller 1123.

Figure 8:
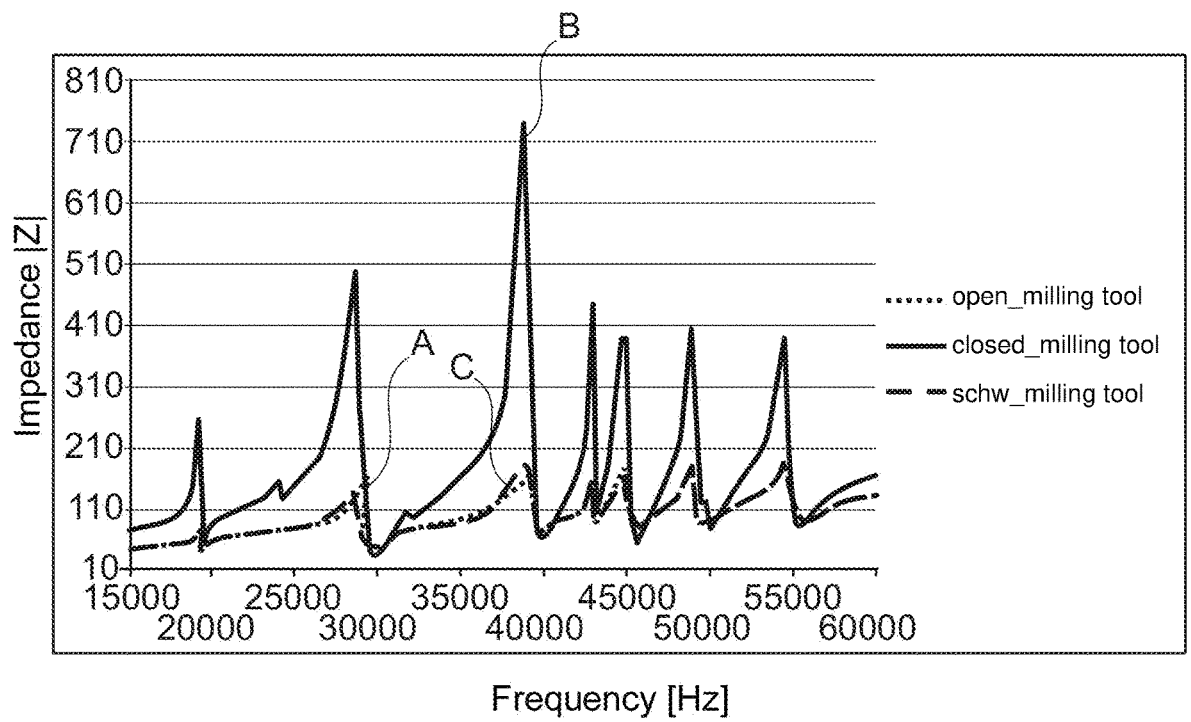
FIG. 8 shows an example of different impedance or phase profiles as a function of frequency.
Figure 8:
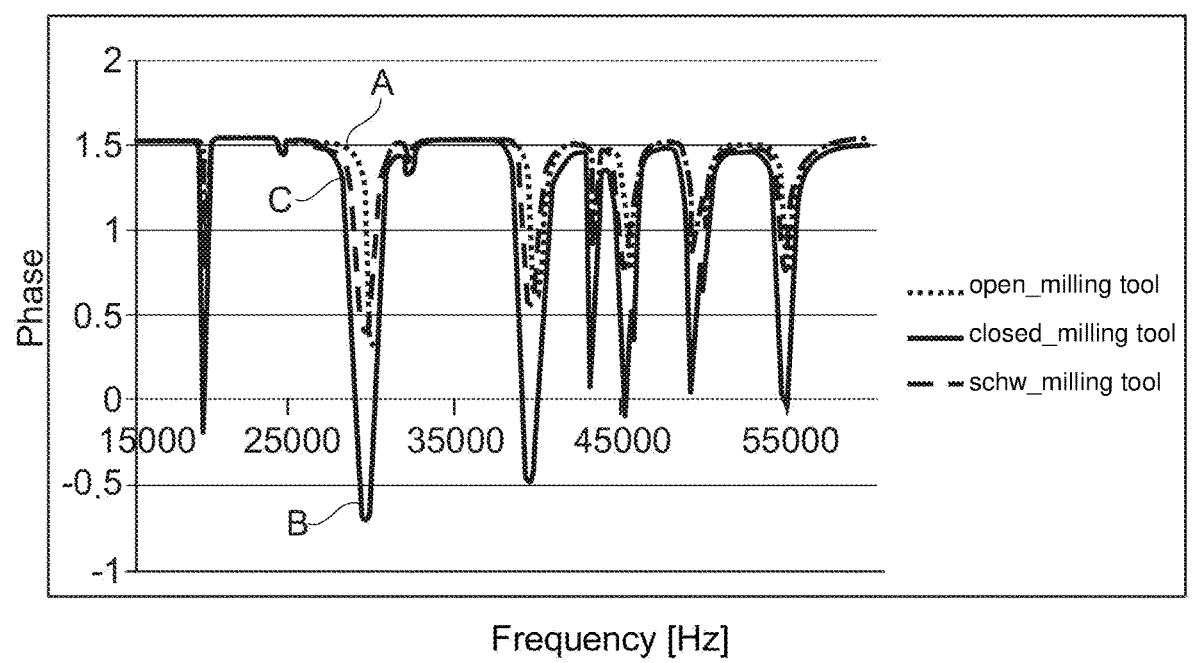
Figure 9A:
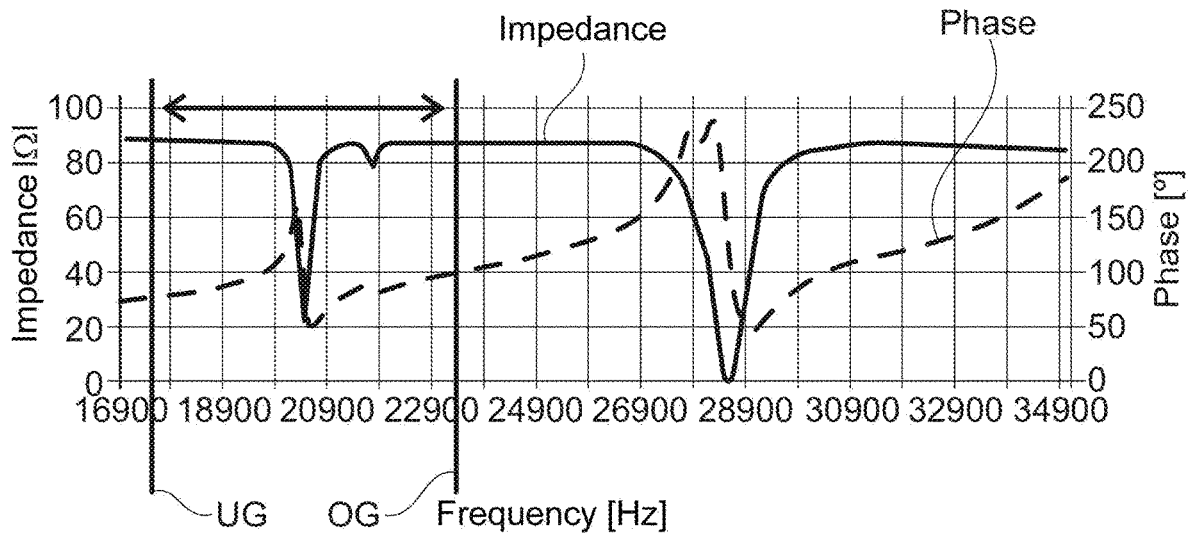
FIGS. 9A and 9B show examples of different impedance or phase profiles as a function of frequency.
Figure 9B:
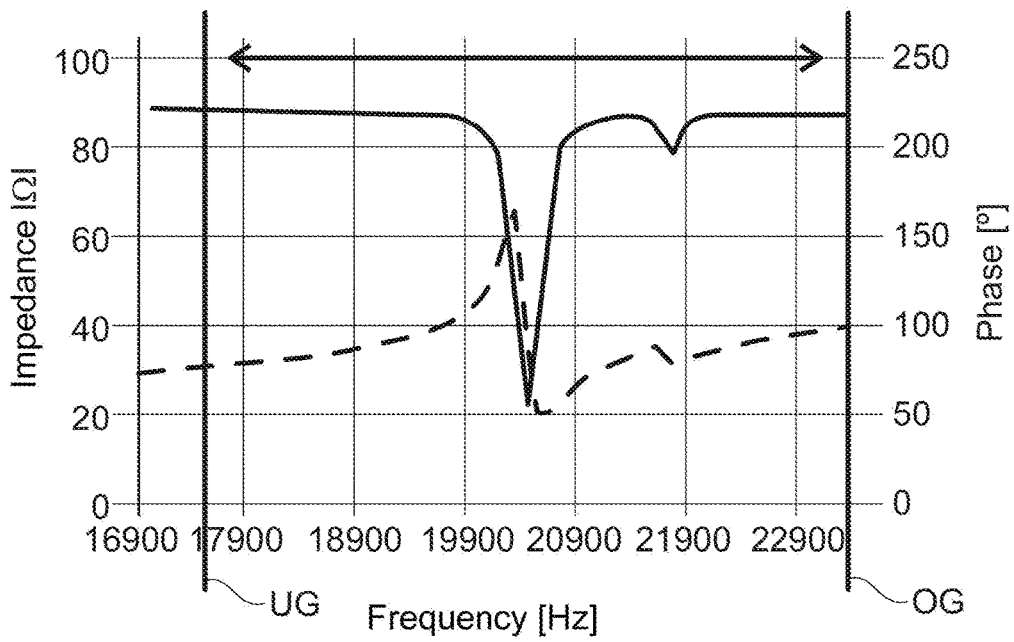

For background information, see FIGS. 8, 9A and 9B, each showing different impedance or phase curves as a function of frequency.

FIG. 8 shows in particular, by way of example, different impedance profiles or associated phase profiles as a function of frequency over a wide frequency range from approximately 15 kHz to approximately 60 kHz for different tools (A: open_milling tool, B: closed_milling tool or C: schw-_milling tool).

Here, it can be seen that different tools may sometimes have very different impedance profiles or associated phase profiles, in part with very different impedance or phase spikes in the respective minima or maxima and also with shifted resonance frequencies. In particular, it should be noted that multiple maxima or minima, i.e. multiple resonances, occur.

In general, the phase profile has a minimum at resonance points so that the phase is suitable as a control variable for controlling the generator 120 or 1124 to a resonance point. The respective impedance curve first has a maximum (parallel resonance) and then a minimum (series resonance) at each resonance point. The order of maximum and minimum is caused by our inductive energy transfer. In case of a direct connection without a transformer, the order is always exactly reversed (minimum-maximum).

According to exemplary embodiments, the control of the generator is configured in such a way that the controller 1123 tries to set the frequency such that the ultrasound transducer or actuator 20 is operated at a frequency in the impedance maximum of the resonance point.

However, it should be noted that different curves can be seen in FIG. 8, originating, by way example, always from the same actuator 20 with the same transmitter. In general, the following factors may influence the exact nature of the curves:

the size of the air gap between transmitter and receiver,
mechanical tolerances in the manufacture of actuators and transmitters,
electrical tolerances in the manufacture of actuators and transmitters, and
possible faults within the machine.

Due to the fact that differences between the individual impedance curves may arise (a) due to tolerances and aging effects and (b) due to the use of a variety of different tools, the following measures are proposed according to exemplary embodiments:

In order to determine a resonance point, a frequency scan can be carried out over a larger frequency range by means of the generator 120/1224 in order to search for the minima in the phase curve. These minima in the phase curve are generally well pronounced (see FIG. 8) and can therefore be determined in a frequency scan.

In general, a plurality of minima (see FIG. 8) are within a larger preset frequency range, e.g. 15 kHz and 60 kHz, so that, if several minima are found in the frequency scan, a distinction can be made and a suitable resonance point can be selected.

With regard to the frequency determination via the frequency scan, the generator may be given a specification as to which phase differences are to be classified as resonance points. For example, a maximum depth and/or a minimum depth of the minimum may be specified or predetermined. In particular, minima below the minimum depth may be ignored as "noise".

Different actuators 20 (e.g., also with different tools 90) may in turn generate minima of different depths.

During operation, the controller 1123 should now drive or control the generator 1124 in such a way that the frequency during operation is set such that the frequency is in resonance (frequency control). For this purpose, the phase of the sensor signal of the sensor 40 may be used as the control variable.

On the other hand, the controller 1123 may be set such that, in resonance, the generator outputs a constant current amplitude to the actuator because a constant current amplitude is physically associated to a constant oscillation amplitude (current control).

By Ohm's law, however, the generator can only drive a maximum current I=U/R at a given maximum output voltage U. If the desired output current (e.g., as specified by the operator) exceeds this value, the controller may become unstable, since there is no state in which the specified value can be reached.

Conversely, the maximum output voltage can only be specified up to a certain limit since, for a given number of levels between 0V and a maximum voltage, the resolution would otherwise deteriorate unnecessarily for the controller. In addition to the pure impedance/phase parameters, parameters of the PID controllers used as well as potentially further parameters for setting the frequency and/or current controllers also play a role: In the case of PID controllers, an design of the parameters underlying the control that is optimal or adapted to the system to be controlled is preferred in order to enable accurate processing.

Because of the various actuators that can be used and the different tools that are used, as well as due to different processing scenarios or processing conditions or types of processing, no universal parameter set is suitable.

Preferably, the control device 1120 allows for a function which enables an operator to set up a tool holder with a specific actuator or, if appropriate, also with a specific tool. During set-up, suitable parameters may be determined, selected and set as a basis for the subsequent control of the driving of the actuator, possibly in conjunction with a specific tool, or may be stored in the storage device 1121.

Here, for example, a frequency scan is carried out over a very wide frequency range (possibly in predefinable frequency ranges over a wide range and possibly up to the entire technical bandwidth of the generator). All of the resonance points found may then be checked individually, in particular for selecting which resonance point is suitable for operating the machine with the tool holder or actuator to be set up, possibly in conjunction with a specific tool. There are different possibilities for this:

(1) With damping, for example by bringing up the tool, reacting to a test workpiece, e.g. only suitable resonances (these are damped). A possible set-up method would view or scan all resonances with damping and sort out unsuitable resonances by comparing the curves.

(2) The actual mechanical vibration can be measured using optical (or other) methods in the machine in order to select suitable resonances based on the oscillation amplitudes implemented. Unsuitable resonance points may, e.g., be sorted out based on the oscillation shape.

(3) An oscillation can be generated at the respective resonance points over a defined time and the behavior of the oscillation at each resonance point depending on the time can be observed: If the temporal behavior corresponds to a conventional temperature drift, the corresponding resonance point can be selected as suitable.

(4) Additional sensors (e.g., temperature sensor on the transformer) can detect deviations when the vibration is switched on (e.g., excessive power loss due to heat development on the transformer) in order to sort out unsuitable resonance points.

It is also possible to use one or more of the above selection methods in order to select a suitable resonance point from a plurality of resonance points.

After selection of a suitable resonance point, the frequency range of the generator during operation may then be restricted to a suitable range around the selected resonance point, in particular in such a way that there are no further resonances in the suitable range.

As an example, reference is made to FIGS. 9A and 9B. FIG. 9A shows an impedance profile and an associated phase profile over a wide frequency range, for example from approximately 17 kHz to approximately 35 kHz, in particular two larger phase minima (resonance points) being recognizable in the frequency scan. Here, a resonance point is then selected as an example, and a frequency range which is chosen around the selected resonance point and does not include any further resonance points, can be set via a lower limit value UG and an upper limit value OG, see FIG. 9B (a smaller resonance point at approx. 21.9 kHz can be ignored as noise here, since it has a minima depth below a settable minimum depth).

As a result, the generator may only respond to actual changes in the resonance frequency (e.g., due to damping, heating) within the selected frequency range, but does not accidentally run into the wrong resonance point.

In addition, an impedance/phase measurement may be carried out. Based thereon, the maximum impedance is also determined and the maximum output voltage of the generator is selected as required (by means of a switch). The measurement is carried out either by a special measuring circuit or by activating the oscillation and measuring all relevant variables during operation.

The controller 1123 may include a frequency controller and a current controller (e.g., based on PID controllers).

The response of the controller 1123 to changes in the input variable (e.g., phase for frequency control and/or current for current control) can be set by a plurality of controller constants (e.g., PID controller constants), e.g., determined by three constants (depending on the source, e.g., designated as Kp, Ti or Td)

In addition, one can also define a dead band for the input variable, i.e., a change is only considered as such if it is greater than the dead band width. If there are minor changes within the dead width, the controller 1123 may remain inactive (virtually switched off).

Such a set-up mode is preferably determined for determining a suitable parameter set for a specific combination of tool holder (with transmitter and actuator), preferably in connection with a specific tool. In exemplary embodiments of the invention, in particular preferably for a plurality of certain combinations of tool holder with transmitter and actuator, preferably in conjunction with a certain tool, respective set-up operations are carried out and respective parameter sets are stored on the storage device 1121. This can also already be performed on the part of the machine tool manufacturer and such parameter sets can be pre-stored as parameter data on the machine tool or can be read in later. Furthermore, this can also be carried out by an operator at the machine tool in order to store new parameter sets on the storage device 1121. Depending on the system used, these parameter sets can then be called up, e.g. in case of a corresponding tool change during processing or by an operator when setting up a tool on the machine tool.

Furthermore, different parameter sets may be stored for different tools, respective tool holders with ultrasonic transducers (actuators) or certain combinations of tools with tool holders for different processing conditions or processing types, e.g. for drilling (drilling usually generates rapid load changes when entering/exiting the workpiece material, to which the controller has to react quickly) or for milling (milling usually produces more even and slower load changes. If the controller is too dynamic, it can overswing and become unstable).

In particular, it is possible to change the respective processing-dependent parameter sets during processing on the machine tool or to switch between respective processing-dependent parameter sets during processing on the machine tool, depending on the type or condition of processing. This can also be carried out automatically via the data processing device 1122, which reads the corresponding parameter set from the storage device 1121 when changing the type of processing, e.g. depending on the specifications of the current NC data (e.g., based on an NC program currently being executed) and sets or switches the controller 1123 accordingly.

In the above, examples and exemplary embodiments of the present invention and their advantages have been described in detail with reference to the accompanying figures. It should be emphasized again that the present invention is in no way limited or restricted to the exemplary embodiments and their implementation features described above, but instead further includes modifications of the exemplary embodiments, in particular those that are included within the scope of the independent claims by modifications of the features of the described examples or by combinations of one or more of the features of the examples described.

The invention claimed is:

1. A device for controlling an ultrasound tool unit for machining a workpiece on a machine tool, comprising:
a control device for controlling an ultrasound transducer of said ultrasound tool unit received on a work spindle of said machine tool for machining a workpiece on the basis of a sensor signal input to a controller by means of a generator operated by said controller, on the basis of a first parameter set which is associated with said ultrasound tool unit and sets the operation of said controller,
wherein
said control device comprises a storage device for storing a plurality of parameter sets that are associated with said ultrasound tool unit, and
said control device is configured to switch an operating setting of said controller by changing from said first parameter set to a second parameter set of said plurality of parameter sets stored on said storage device when a tool is replaced.

2. The device according to claim 1, wherein
said control device is configured to switch the operating setting of said controller when processing said workpiece.

3. The device according to claim 1, wherein
said first parameter set is associated with a first type of processing of a plurality of types of processing and said second parameter set is associated with a second type of processing of said plurality of types of processing.

4. The device according to claim 3, wherein
said plurality of types of processing include milling and drilling.

5. A device for controlling an ultrasound tool unit for machining a workpiece on a machine tool, comprising:
a control device for controlling an ultrasound transducer of said ultrasound tool unit received on a work spindle of said machine tool for machining a workpiece on the basis of a sensor signal input to a controller by means of a generator operated by said controller, on the basis of a first parameter set which is associated with said ultrasound tool unit and sets the operation of said controller,
wherein
said control device comprises a storage device for storing a plurality of parameter sets,
said control device is configured to switch an operating setting of said controller by changing said first parameter set setting the operation of said controller on the basis of a second parameter set, which is associated with said ultrasound tool unit, of said plurality of parameter sets stored on said storage device, and
when said ultrasound tool unit on said machine tool is replaced with another ultrasound tool unit, said control device is configured to switch the operating setting of said controller by changing a parameter set associated with said ultrasound tool unit on the basis of a parameter set associated with the other ultrasound tool unit of said plurality of parameter sets stored on said storage device.

6. A device for controlling an ultrasound tool unit for machining a workpiece on a machine tool, comprising:
a control device for controlling an ultrasound transducer of said ultrasound tool unit received on a work spindle of said machine tool for machining a workpiece on the basis of a sensor signal input to a controller by means of a generator operated by said controller, on the basis of a first parameter set which is associated with said ultrasound tool unit and sets the operation of said controller,
wherein
said control device comprises a storage device for storing a plurality of parameter sets,
said control device is configured to switch an operating setting of said controller by changing said first parameter set setting the operation of said controller on the basis of a second parameter set, which is associated with said ultrasound tool unit, of said plurality of parameter sets stored on said storage device, and
when a tool on said ultrasound tool unit on said machine tool is replaced with another tool, said control device is configured to switch the operating setting of said controller by changing a parameter set associated with said tool on the basis of a parameter set associated with the other tool of said plurality of parameter sets stored on said storage device.

7. A machine tool, comprising
a work spindle for receiving an ultrasound tool unit, and
a device for controlling said ultrasound tool unit for machining a workpiece on said machine tool according to claim 1.

8. A method for controlling an ultrasound tool unit for machining a workpiece on a machine tool, comprising:
controlling an ultrasound transducer of said ultrasound tool unit received on a work spindle of said machine tool for machining a workpiece on the basis of a sensor signal input into a controller by means of a generator operated by said controller, on the basis of a first parameter set which is associated with said ultrasound tool unit and sets the operation of said controller,
storing a plurality of parameter sets that are associated with said ultrasound tool unit on a storage device of a control device of said machine tool, and
switching an operating setting of said controller by changing from said first parameter to a second parameter set of said plurality of parameter sets stored on said storage device when a tool is replaced.

9. The method according to claim 8, wherein
the switching of the operating setting of said controller is carried out when said workpiece is being processed.

10. The method according to claim 8, wherein
said first parameter set is associated with a first type of processing of a plurality of types of processing and said second parameter set is associated with a second type of processing of said plurality of types of processing.

11. The method according to claim 8, wherein
said plurality of types of processing include milling and drilling.

12. The method according to claim 8, further comprising the steps of
exchanging said ultrasound tool unit on said machine tool with another ultrasound tool unit, and
switching an operating setting of said controller by changing a parameter set associated with said ultrasound tool unit on the basis of a parameter set, which is associated with the other ultrasound tool unit, of said plurality of parameter sets stored on said storage device.

13. The method according to claim 8, further comprising the steps of
exchanging a tool on said ultrasound tool unit on said machine tool with another tool, and
switching an operating setting of said controller by changing a parameter set associated with said tool on the basis of a parameter set, which is associated with the other tool, of said plurality of parameter sets stored on said storage device.

* * * * *